Figure 1:
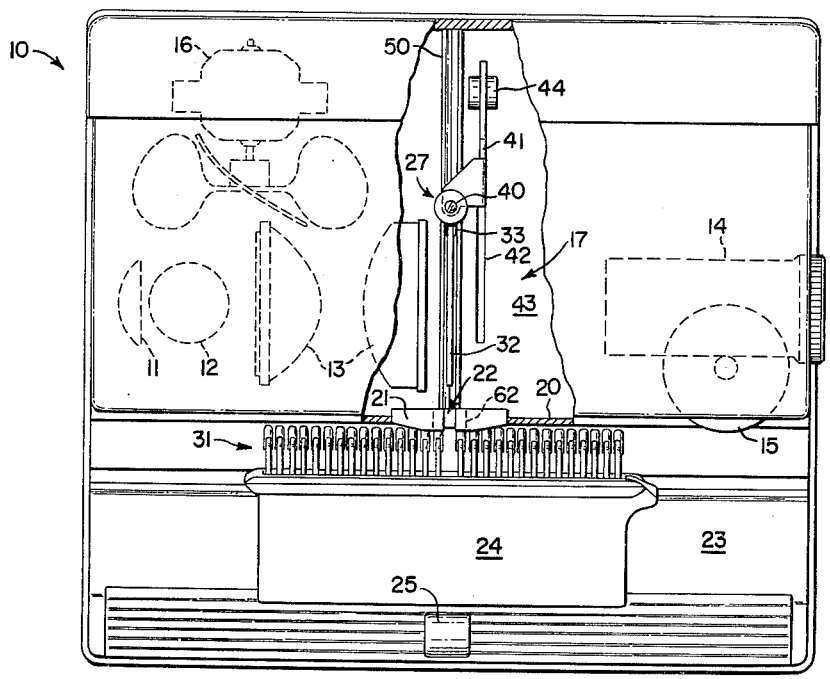

*INVENTOR.*
ROBERT F. MC CAMMON
BY
*ATTORNEY*

_United States Patent Office_ 2,999,424
Patented Sept. 12, 1961

2,999,424
SLIDE CHANGER APPARATUS
Robert F. McCammon, Denver, Colo., assignor to Minneapolis-Honeywell Regulator Company, Minneapolis, Minn., a corporation of Delaware
Filed Nov. 1, 1960, Ser. No. 66,619
5 Claims. (Cl. 88—28)

The present invention is concerned with an improved photographic projector and particularly a magnetic type projector having slide changing mechanism and slide tray advancing mechanism. The inventive concept of the present invention is concerned with the utilization of a rotatably mounted magnet which is adapted to magnetically engage one of the slides in a slide storage tray and move this one slide to the projection compartment within the projector. Upon return of this one slide to the slide storage tray, the slide tray advancing mechanism is actuated to move the slide tray, and bring a second slide into engaging position with the magnet. During this movement of the slide tray, the rotatably mounted magnet rotates in the direction of the movement of the slide tray to thereby minimize the force required to move the slide tray, since the rolling action of the magnet tends to cam the first slide off of the magnet while the second slide is being moved into position of magnetic engagement with the magnet.

Photographic slide projectors of the prior art which utilize slide storage trays holding a plurality of individual photographic slides in a side-by-side relationship provide means whereby this tray may be placed on a slide tray receiving platform of the projector. When the slide tray is thus placed in position on the slide tray receiving platform, the slide tray cooperates with slide changing means and slide tray advancing means so that the slide tray may be moved in a step-by-step fashion as succeeding slides are brought into alignment with a slide receiving window formed in a side wall of the projector. This slide receiving window communicates with a projection compartment within the projector adapted to receive slides to be projected on a screen or the like. The slides may be moved out of the slide storage tray by various means as taught by the prior art. Once the slide is projected it may be moved back into the slide storage tray and the slide tray may then be advanced or moved to bring another slide into alignment with the slide receiving window.

The advantages of utilizing a magnet, usually of the permanent magnet type, to magnetically engage the slide and then to move the magnet to cause the slide to move to the slide projection position has been generally recognized in the prior art, and the advantages of such an arrangement are that excessive wear of the slides is avoided. Furthermore, should the slide tend to jam at or near slide receiving window, the magnetic coupling is broken without damaging the slide, as so often occurs in the slide changing mechanism in which actual physical coupling exists between the changing mechanism and the slide.

The present invention is directed to an improved magnetic slide changing construction which, in addition to the above advantages, reduces the force component necessary to move the slide tray to break the magnetic coupling between a first slide and move a second slide into engaging position with the magnet. Specifically, this is accomplished by means of a rotatably mounted magnet. With the construction of the present invention, as the slide tray moves, the magnet rotates in the direction of movement and allows movement of the slide tray with very little opposition force due to the magnetic couple between the magnet and the slide within the tray. Also, as the slide tray moves, the slide which is magnetically held to the magnet moves to a position wherein the edge of this slide engages the side wall of the projector immediately adjacent the slide receiving window. Thus, further movement of the slide tray causes the side wall of the projector to act as a lever or cam, and this camming action, combined with the rotation of the magnet, breaks the magnetic couple with a minimum amount of force. This construction is of particular utility in the case of an electric drive type projector wherein the operating force is of necessity quite limited.

In the preferred embodiment of the present invention the magnet takes the form of a wheel or disc having flat disc pole pieces positioned on the two opposite surfaces thereof. The magnet and the pole pieces are provided with centrally located holes or openings and are thereby loosely mounted on a shaft, which shaft is in turn mounted on a movable lever of the slide changing mechanism. This lever is movable to facilitate movement of the magnet and of a slide between the slide storage tray and the projector projection compartment. The shaft upon which the magnet and its pole pieces are loosely mounted is disposed at a right angle to the direction of movement of the slide tray and therefore substantially parallel to the edge of the slide, so that the magnet and pole pieces are in turn free to rotate in the direction of movement of the slide tray.

Figure 2:
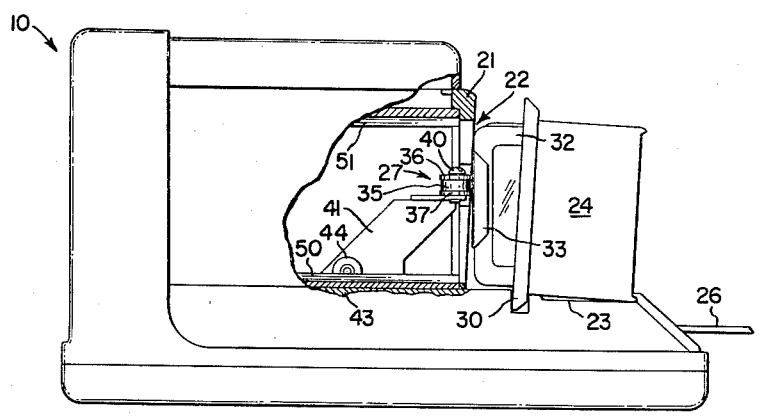
Figure 3:
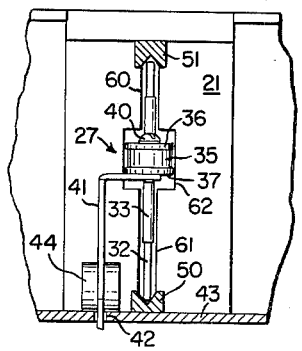
Figure 4:
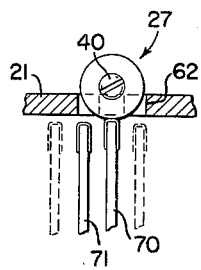
Figure 5:
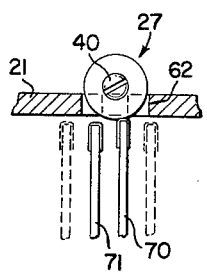
Figure 6:
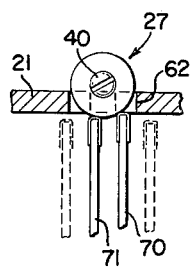

The present invention will be apparent to those skilled in the art upon reference to the following specification, claims, and drawings of which:

FIGURE 1 is a top view, partially broken away, of a slide projector, showing a slide storage tray and showing a slide disposed at the projection compartment of the projector, FIGURE 2 is an end view of the projector of FIGURE 1, again broken away, and showing the slide of FIGURE 1 returned to its position within the slide storage tray, FIGURE 3 is a view of the projector slide changing mechanism showing the inside surface of the projector wall wherein the slide receiving window is formed, and FIGURES 4, 5, and 6 are showings of various operating positions of the magnet and cooperating photographic slides, showing the manner in which the magnet rotates as the slide storage tray advances.

Referring now to FIGURE 1, reference numeral 10 designates generally a photographic projector having an optical axis defined by means including a reflector 11, a lamp 12, a condensing lens system 13, and an objective lens 14, the objective lens being focused by means of a focusing member 15. Also disposed within the projector 10 is a cooling fan 16 to cause air to flow over and to cool the bulb and other elements of the projector.

The upper portion of the case or housing of projector 10, which covers the members 11-16 has been broken away to show the projection compartment of the projector designated generally by means of the reference numeral 17. This projection compartment is adapted to receive a photographic slide which is positioned in alignment with the optical axis of the projector to be projected on a screen or the like.

Projector 10 includes a generally vertically disposed side wall 20, FIGURES 1 and 2, which runs the length of the projector and includes as a portion of the side wall a member 21 including a slide receiving window designated generally by means of the reference numeral 22. Member 21 is preferably formed of a non-magnetic material. Immediately adjacent the projector side wall 20, and located at the outside thereof, is a generally horizontally disposed slide tray receiving platform 23 which runs the entire length of the projector and is adapted to receive a box-shaped slide storage tray 24.

Disposed within the lower portion of projector 10, as viewed in FIGURE 2, and below the level of platform 23 and inner floor member 43, is slide changing mechanism and slide tray advancing mechanism which are controlled by means of a manually operable control knob 25 adapted to be pulled out of the projector case to an extended position to expose an operating lever 26 of FIGURE 2. For purposes of simplicity, the actual slide changing mechanism and slide tray advancing mechanism, the specific construction of which does not form an essential element of the present invention, has not been disclosed. It suffices to say that the manual control means 25—26 when placed in the retracted position of FIGURE 1 causes the slide changing mechanism, including a magnet 27, to be positioned at the projection compartment of the projector. When the manually operable means 25—26 is extended to the position shown in FIGURE 2, then magnet 27 is positioned at window 22 formed in the side wall of the projector. Furthermore, after magnet 27 has been positioned as shown in FIGURE 2, an amount of over travel or lost motion is provided whereby further movement of the manual control means 25—26 to the extended position causes a slide tray advancing mechanism, not shown, to engage a gear rack formed in the member 30 of slide storage tray 24 to move the tray a distance corresponding to the individual spacing of the slides within the slide storage tray.

Referring now specifically to slide storage tray 24, this tray is preferably formed of a plastic material and includes separators, not shown, to form slide receiving compartments to thereby hold a plurality of slides in a parallel side-by-side relationship as can be seen in FIGURE 1. In FIGURE 1, the slides are identified generally by means of the reference numeral 31. One of these slides 32 is shown disposed at the projection compartment 17 of the projector and this slide is provided with a clip 33 formed of a magnetic material which is attracted by magnet 27. As can be seen in FIGURE 2, the slide storage tray 24 is positioned at a slight tilt or angle and therefore the slides remaining in tray 24, and as viewed from the top in FIGURE 1, are also slightly tilted. Thus, the magnetic clips on the slides 31 remaining in tray 24 of FIGURE 1 can be seen from this tilted position. When slide 32 is first returned to the storage tray 24, as seen in FIGURE 2, the slide remains at substantially an upright position whereas the remaining slides within the tray are tilted. While the particular slides shown in this application are provided with a magnetic clip, it is within the teachings of the present invention that the mounting of the slide be made of magnetic material, whereby the clip can be eliminated. Conventionally however such slides are normally mounted in cardboard mounts and a clip of the type 33 is necessary. This clip not only provides a means whereby magnet 27 may move the cardboard mounts, but also protects the cardboard edge of the mount from excessive wear and fraying as the slides are projected a number of times.

Referring now specifically to magnet 27, this magnet, as seen in FIGURES 2 and 3 includes a magnetic member 35 having a pair of pole pieces 36 and 37 positioned on the upper and lower surfaces thereof. Magnet 35 is a wheel or button like magnet which is circular and provided with a central opening. The pole pieces 36 and 37 also wheel-like and are provided with central openings. These openings are adapted to receive a bolt 40 which loosely mounts the magnet to a support member 41. Support member 41 includes a portion which extends through a slot 42 formed in the floor 43 of the projector, this floor 43 separating the projection compartment 17 of the projector from the slide changing mechanism and the slide tray advancing mechanism which lies below the floor. Also, member 41 includes a roller 44 which rolls along floor 43 in the vicinity of slot 42 to aid in supporting magnet 27.

Manual control means 25—26 is effective when moved from its retracted to its extended position to cause support member 41 to move along slot 42 to thus bring magnet 27 from its position of FIGURE 1 to its position of FIGURE 2 and thereby move a slide from the projection position to the slide changing position. Floor 43 of the projector is provided with a lower slide guide 50 which can be seen in FIGURES 1, 2, and 3. In FIGURES 2 and 3 the upper slide guide 51 is shown, the upper guide cooperating with the upper edge of the slide. The slide receiving window 22 is more completely shown in FIGURE 3 and from this figure it can be seen that the window includes an upper and lower narrow portion 60 and 61 respectively and a central wide portion 62, the wide portion 62 being adapted to receive magnet 27. As shown in FIGURES 4, 5, and 6, this central wide portion 62 allows magnet 27 to enter the side wall 20 of the projector and project a slight distance beyond this wall. For example, with a magnet one-half inch diameter, the magnet may extend .03 inches beyond the outer surface of member 21.

As has been pointed out, the present invention is directed to an improvement in a projector utilizing a slide changing mechanism and a slide storage tray which improvement is brought about by the use of a loosely mounted and rotatable magnet which rotates in the direction of movement of the slide tray to thereby minimize the amount of force necessary to move the tray and to break the magnetic couple between the magnet and a first slide, while moving a second slide is moved into position. This unique construction, and the new and unusual result achieved thereby, can be readily appreciated by reference to FIGURES 4, 5, and 6. The slide designated by reference numeral 70 is shown in FIGURE 4 in the position where it has just been returned to its compartment within the slide storage tray by means of movement of magnet 27. A second slide 71 must now be moved to a position corresponding to that of slide 70 as the slide tray moves to the right, as viewed in FIGURES 4, 5, and 6. In FIGURE 5, the slide tray has moved a short distance, for example, one-third of the spacing of slides 70 and 71 and it can be seen that while magnet 27 remains in engagement with the clip placed on the edge of slide 70, the magnet has rotated. In the showing of FIGURE 6, the slide tray has advanced to a point where the next succeeding slide 71 has been attracted and moved into engaging position with magnet 27. Slide 70 remains with an edge portion thereof in engagement with magnet 27 while the major portion of the edge of slide 70 now engages the outside surface of side wall member 27 in the vicinity of reduced portions 60 and 61 of the slide receiving window 22. Thus, as the slide tray continues to move and bring slide 71 into alignment with the center of slide receiving window 22, magnet 27 continues to rotate and slide 70 is cammed off of magnet 27 as the slide tray continues movement from the position as shown in FIGURE 6.

From the above description it can be seen that I have provided an improved photographic projector of the type utilizing a magnetic changing principle with the attendant advantages of such a construction and specifically I have provided an improved magnetic construction utilizing a rotatable magnet to allow relatively free movement of slide storage tray 24, wherein magnet 27 in attracting the slides within the storage tray exerts a minimum amount of opposition force to movement of the slide storage tray. Other modifications of the present invention will be apparent to those skilled in the art and it is therefore intended that the scope of the present invention be limited solely by the scope of the appended claims.

I claim as my invention:

1. In a photographic projector having a slide changer and having a slide tray holding a plurality of individual slides in a side by side relationship, with each of the slides having a magnetic edge adapted to move past a slide receiving window in a wall of the projector, whereby the slides may be individually moved to a projecting position by virtue of the slide changer, the improvement comprising; a magnet having a round configuration, means loosely mounting said magnet on a shaft which is substantially parallel to the edge of the slides so that said magnet is free to rotate and allow relatively free movement of the slide tray as the next succeeding slide is moved into position to engage said magnet, and means mounting said shaft on the slide changer.

2. In a photographic projector, a slide changing mechanism, a movable slide tray adapted to hold a plurality of individual photographic slides in a side by side relationship, each of these slides having a magnetic edge adapted to be moved into alignment with a slide receiving window in a wall of the projector, a round wheel-shaped magnet having a centrally disposed opening, the slide changing mechanism being constructed and arranged to position said magnet at the slide receiving window such that one of the slides is magnetically coupled to said magnet and may then be moved into a projecting position within the projector, followed by movement of the slide back to the slide tray and movement of the slide tray to bring a succeeding slide into position adjacent the slide reeciving window, a shaft, and means including the opening in said magnet mounting said magnet loosely upon said shaft so as to allow rotation of said magnet in the direction of movement of the slide tray and thereby reduce the force necessary to move the slide tray and break the magnetic coupling between the magnet and the slide which has been returned from slide projecting position.

3. In combination, an elongated slide tray having an open side and having compartments adapted to receive a plurality of individual photographic slides in a side by side relationship, each of the slides having a magnetic edge disposed along the open side of the slide tray, slide changing means including a member movable substantially at right angles to said slide tray and including slide tray advancing means associated with said slide tray to move said slide tray a distance equal to the spacing of the individual slides as said movable member moves from a slide projecting position to a slide changing position and back to the slide projecting position, a shaft mounted on said movable member susbtantially perpendicular to the direction of movement of said slide tray, and a wheel shaped permanent magnet rotatably mounted on said shaft, said magnet being mounted such that when said movable member is in said slide changing position, said magnet magnetically engages a first of the slides and through magnetic attraction causes this first slide to be moved to the slide projecting position, whereupon the first slide may then be returned to the slide changing position and the slide tray advanced to bring a second slide into engagement with said magnet, said magnet being free to rotate such that a minimum amount of force is necessary to break the magnetic attraction between the first slide and said magnet as said slide tray is advanced to bring the second slide into engaging position with said magnet.

4. A photographic slide projector, comprising; a housing enclosing a slide projection compartment, a slide receiving window formed in a side wall of said housing adjacent said projection compartment; a slide tray receiving platform formed adjacent said side wall and adapted to support a slide tray having a plurality of photographic slides held in a side by side position, each of the slides having a magnetic edge disposed adjacent said side wall and adapted to be individually moved past said slide receiving window as the slide tray is moved; slide changing means including a movable member which is movable from a first position in the vicinity of said slide receiving window to a second position at said projection compartment, a shaft mounted on said movable member, a round magnet mounted for rotation on said shaft and disposed at said slide receiving window when said movable member is in said first position to thereby magnetically attract a slide which is disposed at said slide receiving window, said movable member then being effective upon movement to said second position to cause the slide to be moved to said projection compartment by virtue of magnetic attraction, and to thereafter be returned to the slide tray; and slide tray advancing means controlled by said movable member after the slide has been returned to the slide tray to move the slide tray and bring a succeeding slide into alignment with said slide receiving window, said magnet rotating during movement of the slide tray to thereby reduce the force necessary to so move the slide tray.

5. In a photographic projector, slide changer, a slide tray holding a plurality of individual slides in a side by side relationship, with each of the slides having a magnetic edge adapted to move past a slide receiving window in a wall of the projector as said slide tray moves whereby the slides may be individually moved to a projection position by said slide changer, a magnet, and means movably mounting said magnet on said slide changer to thereby position said magnet at said window with a first portion of said magnet in engagement with one of the slides, said magnet being movable to allow movement of said magnet relative to said slide changer and in the direction of movement of said slide tray to allow erlatively free movement of the slide tray as the next succeeding slide is moved into position to engage a second portion of said magnet.

References Cited in the file of this patent

UNITED STATES PATENTS 2,936,672    May et al. _____ May 17, 1960

FOREIGN PATENTS 843,954    France _____ Apr. 11, 1939